(12) United States Patent
Tsai et al.

(10) Patent No.: US 9,007,673 B2
(45) Date of Patent: Apr. 14, 2015

(54) ELECTROCHROMIC DEVICE INCLUDING METAL LINES

(71) Applicant: Leader Optronics Technology Co., Ltd., Tainan (TW)

(72) Inventors: Chih-Jen Tsai, Tainan (TW); Shyh-Haur Su, Tainan (TW)

(73) Assignee: Leader Optronics Technology Co., Ltd., Tainan (TW)

( * ) Notice: Subject to any disclaimer, the term of this patent is extended or adjusted under 35 U.S.C. 154(b) by 0 days.

(21) Appl. No.: 14/136,780

(22) Filed: Dec. 20, 2013

(65) Prior Publication Data

US 2014/0177026 A1    Jun. 26, 2014

(30) Foreign Application Priority Data

Dec. 26, 2012    (TW) .............................. 101150150 A

(51) Int. Cl.
*G02F 1/155*    (2006.01)

(52) U.S. Cl.
CPC ..................................... *G02F 1/155* (2013.01)

(58) Field of Classification Search
USPC ................................... 359/265–275; 345/105
See application file for complete search history.

(56) References Cited

U.S. PATENT DOCUMENTS 8,520,287 B2 *    8/2013    Lee et al. ...................... 359/273

* cited by examiner

*Primary Examiner* — Tuyen Tra
(74) *Attorney, Agent, or Firm* — Cesari and McKenna, LLP

(57) ABSTRACT

An electrochromic device includes: a first electrode unit including a first electrode layer, a plurality of spaced apart metal lines that are formed on the first electrode layer, and a plurality of insulator strips that cover the metal lines, respectively; a second electrode unit spaced apart from the first electrode unit and including a second electrode layer; and an electrochromic unit sandwiched between the first and second electrode units and including an electrochromic layer and an electrolyte layer. The electrochromic layer is formed on the first electrode layer. The electrolyte layer is disposed between the electrochromic layer and the second electrode layer.

12 Claims, 8 Drawing Sheets

ELECTROCHROMIC DEVICE INCLUDING METAL LINES

CROSS-REFERENCE TO RELATED APPLICATION

This application claims priority of Taiwanese application no. 101150150, filed on Dec. 26, 2012.

BACKGROUND OF THE INVENTION

1. Field of the Invention

The invention relates to an electrochromic device, and more particularly to an electrochromic device that includes an electrode layer and a plurality of metal lines formed on the electrode layer.

2. Description of the Related Art

Electrochromic devices include an electrochromic material that can change color when an electric field applied thereto is changed. Hence, the electrochromic devices can be used in the manufacture of products, such as sun glasses, window panels, and display screens.

FIG. 1 illustrates a conventional electrochromic device that includes a first substrate 11, a transparent first electrode layer 12, an electrochromic layer 13, an electrolyte layer 14, a second substrate 15, and a transparent second electrode layer 16. The electrolyte layer 14 is indirect contact with the second electrode layer 16 and the electrochromic layer 13. When a potential is applied between the first and second electrode layers 12, 16, electrons released from the first electrode layer 12 enter the electrochromic layer 13, which causes chemical reduction and/or oxidation reactions of the electrochromic layer 13, and which, in turn, results in change in the color of the electrochromic layer 13. The rate of color change depends on the diffusion rate of the electrons in the electrochromic layer 13. The conventional electrochromic device is disadvantageous in that, when the size thereof is relatively large, non-uniform color change of the electrochromic layer 13 tends to occur.

SUMMARY OF THE INVENTION

Therefore, the object of the present invention is to provide an electrochromic device that can overcome the aforesaid drawback associated with the prior art.

According to the present invention, there is provided an electrochromic device that comprises: a first electrode unit including a first electrode layer, a plurality of spaced apart metal lines that are formed on the first electrode layer, and a plurality of insulator strips that at least partially cover the metal lines, respectively; a second electrode unit spaced apart from the first electrode unit and including a second electrode layer; and an electrochromic unit sandwiched between the first and second electrode units and including an electrochromic layer and an electrolyte layer. The electrochromic layer is formed on the first electrode layer. The electrolyte layer is disposed between the electrochromic layer and the second electrode layer.

BRIEF DESCRIPTION OF THE DRAWINGS

In drawings which illustrate embodiments of the invention.

DETAILED DESCRIPTION OF THE PREFERRED EMBODIMENTS

Figure 1:
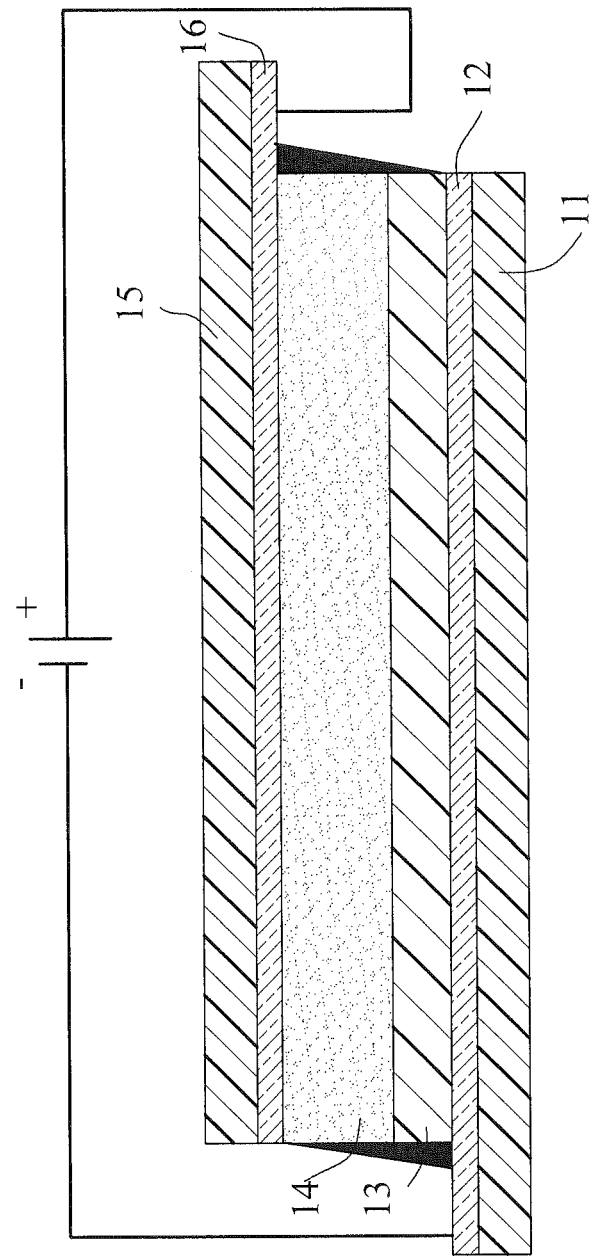
FIG. 1 is a sectional view of a conventional electrochromic device.

Before the present invention is described in greater detail with reference to the accompanying preferred embodiments, it should be noted herein that like elements are denoted by the same reference numerals throughout the disclosure.

Figure 2:
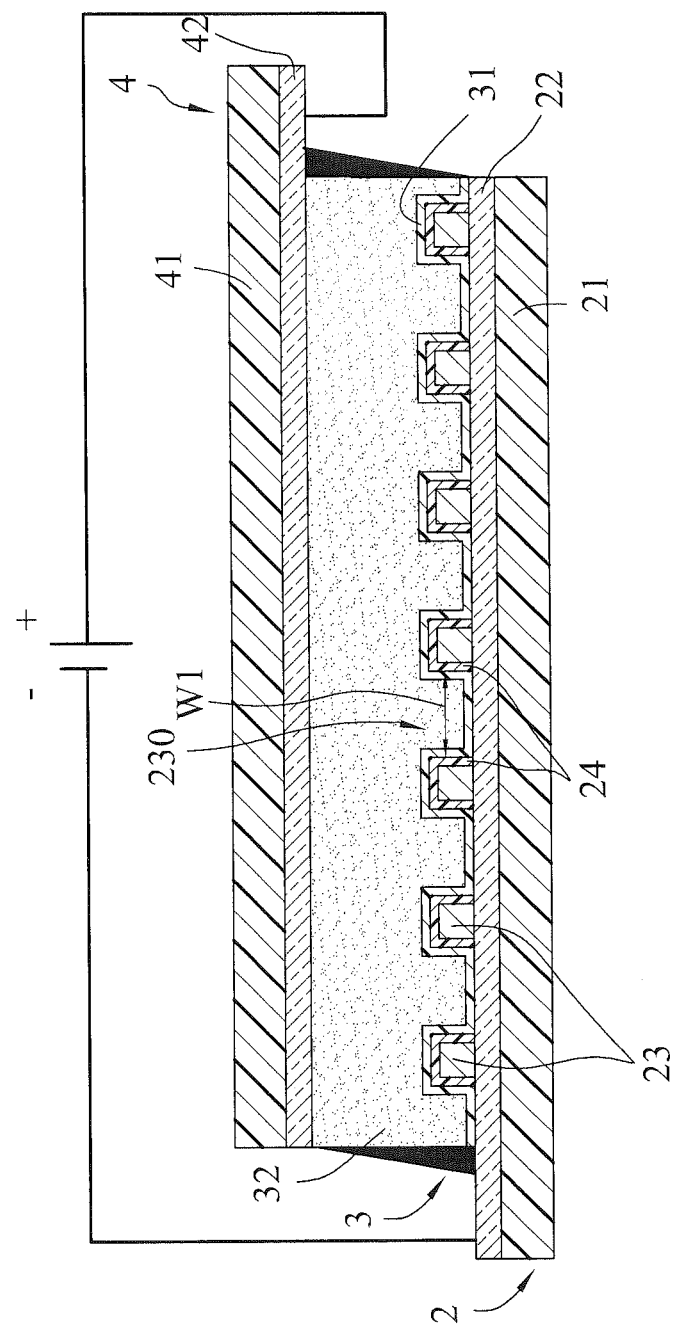
FIG. 2 is a sectional view of the first preferred embodiment of an electrochromic device according to the present invention.
Figure 3:
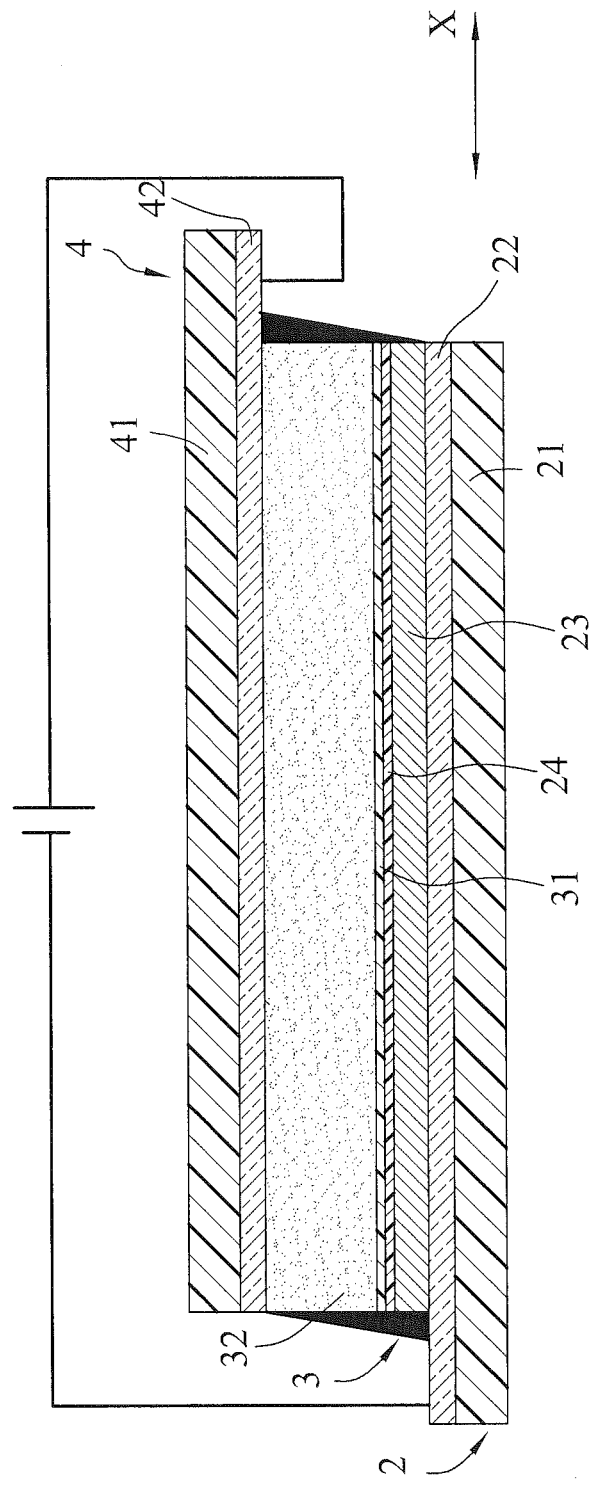
FIG. 3 is another sectional view of the first preferred embodiment.

FIGS. 2 and 3 illustrate the first preferred embodiment of an electrochromic device according to the present invention. The electrochromic device includes a first electrode unit 2, an electrochromic unit 3, and a second electrode unit 4.

The first electrode unit 2 includes a first substrate 21, a first electrode layer 22 that is formed on the first substrate 21, a plurality of spaced apart first metal lines 23 that are formed on the first electrode layer 22, and a plurality of first insulator strips 24 that at least partially cover the first metal lines 23, respectively. In this embodiment, the first insulator strips 24 entirely cover the first metal lines 23, respectively.

The second electrode unit 4 is spaced apart from the first electrode unit 2, and includes a second substrate 41 and a second electrode layer 42 that is formed on the second substrate 41.

The electrochromic unit 3 is sandwiched between the first and second electrode units 2, 4, and includes a first electrochromic layer 31 and an electrolyte layer 32. The first electrochromic layer 31 is formed on the first electrode layer 22, and covers the first insulator strips 24. The electrolyte layer 32 is disposed between and is in contact with the first electrochromic layer 31 and the second electrode layer 42.

In this embodiment, the first metal lines 23 extend in a first direction (X). Every two adjacent ones of the first metal lines 23 are spaced apart from each other by a first gap 230 that has a width ($w_1$) ranging from 20 mm to 600 mm.

In this embodiment, each of the first and second substrates 21, 41 is flexible, and is made from a material that is selected from the group consisting of flexible polyethylene terephthalate, polycarbonate, polymer of acrylic acid, and combinations thereof. Alternatively, each of the first and second substrates 21, 41 may be rigid, and is made from a material that is selected from the group consisting of glass and rigid polyethylene terephthalate.

Each of the first and second electrode layers 22, 42 is preferably made from a transparent conductive material that is selected from the group consisting of indium tin oxide (ITO), tin oxide ($SnO_2$), antimony tin oxide (ATO), zinc oxide, and combinations thereof. Alternatively, each of the first and second electrode layers 22, 42 may be made from a non-transparent conductive material.

Each of the first conductive lines 23 is made from a metallic material that is preferably selected from the group consisting of Au, Ag, Cu, Al, and combinations thereof. Other suitable conductive metallic materials may be used in other embodiments.

The first electrochromic layer 31 is made from a metal oxide, a transition metal cyanide, or a conductive organic polymer. Examples of the metal oxide include tungsten trioxide ($WO_3$), Nickel(III) oxide ($Ni_2O_3$), Copper(II) oxide (CuO), Molybdenum trioxide ($MoO_3$), Vanadium(V) oxide ($V_2O_5$), Titanium dioxide ($TiO_2$), Caesium oxide ($Cs_2O$), Niobium(V) oxide ($Nb_2O_5$), Zinc oxide hydrate ($ZnO \cdot xH_2O$), and combinations thereof. Examples of the transition metal cyanide include Ferric ferrocyanide, Indium hexacyanoferrate, Copper hexacyanoferrate, Nickel hexacyanoferrate, and combinations thereof. Examples of the conductive organic polymer include poly (3,4-ethylenedioxythiophene), polythiophene, polyaniline, pyrimidine dimer, Vioiogen, and combinations thereof.

The electrolyte layer 32 can be in liquid, solid, or gel form. In this embodiment, the electrolyte layer 32 is a gel that includes an organic solvent, a polymeric material, propylene carbonate, and a salt. The organic solvet is selected from the group consisting of tetrahydrofuran (THF), alcohol, and the combination thereof. The polymeric material is selected from the group consisting of polymethylmethacrylate (PMMA), polystyrene and the combination thereof. The salt can be disassociated in the organic solvent into ions, one of which is selected from the group consisting of hydrogen ion, sodium ion, potassium ion, lithium ion and combinations thereof.

The first insulator strips 24 are made from an electrical insulative material that is selected from the group consisting of photo curable resins, thermal curable resins, non-conductive curable resins, and epoxy resin, and that is capable of preventing penetration of the substances of the electrolyte layer 32 therethrough so as to avoid corrosion or formation of rust on the first metal lines 23.

The first and second electrode layers 22, 42 are connected to an external power source. In operation, when an effective voltage is applied across the first and second electrode layers 22, 42 by the external power source, the first electrochromic layer 31 may undergo chemical reduction and/or oxidation reactions and change color. With the inclusion of the first metal lines 23 in the electrochromic device of the present invention, the electric current applied across the first and second electrode layers 22, 42 by the external power source can spread uniformly throughout the electrochromic layer 31.

Figure 4:
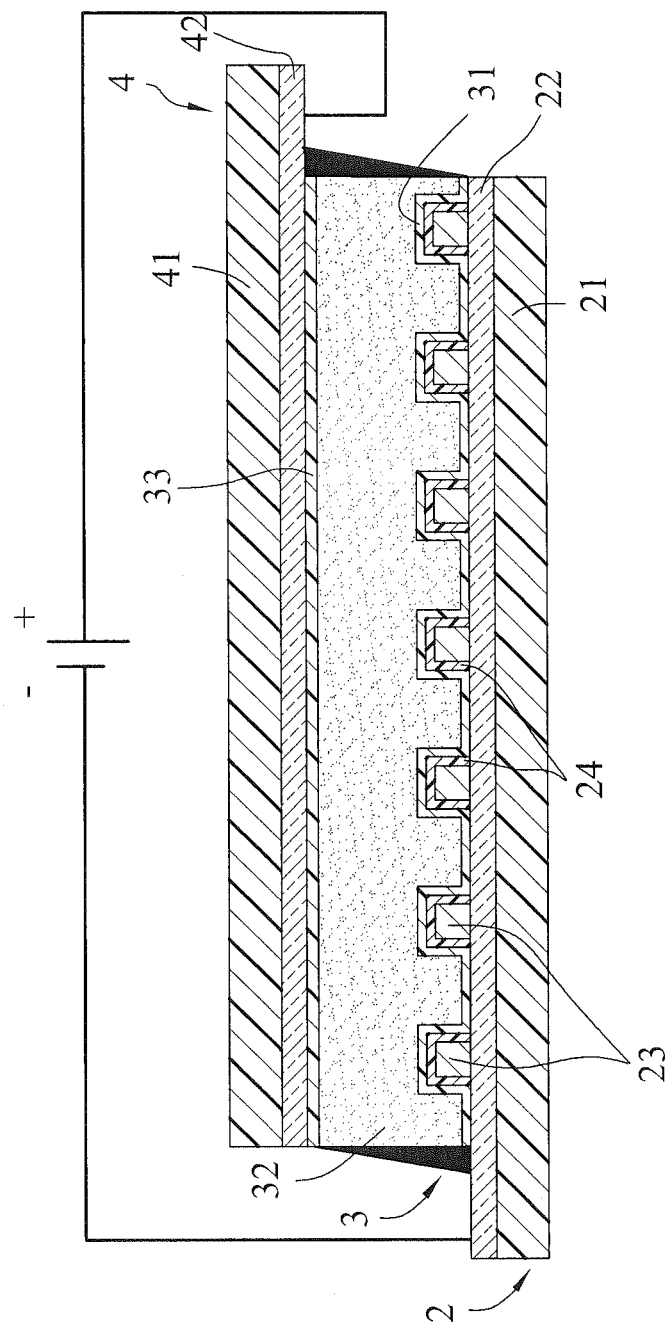
FIG. 4 is a sectional view of the second preferred embodiment of the electrochromic device according to the present invention.

FIG. 4 illustrates the second preferred embodiment of the electrochromic device according to the present invention. The second preferred embodiment differs from the previous embodiment in that the electrochromic unit 3 further includes a second electrochromic layer 33 which is formed on the second electrode layer 42. In this embodiment, the electrolyte layer 32 is disposed between and is in contact with the first and second electrochromic layers 31, 33.

Figure 5:
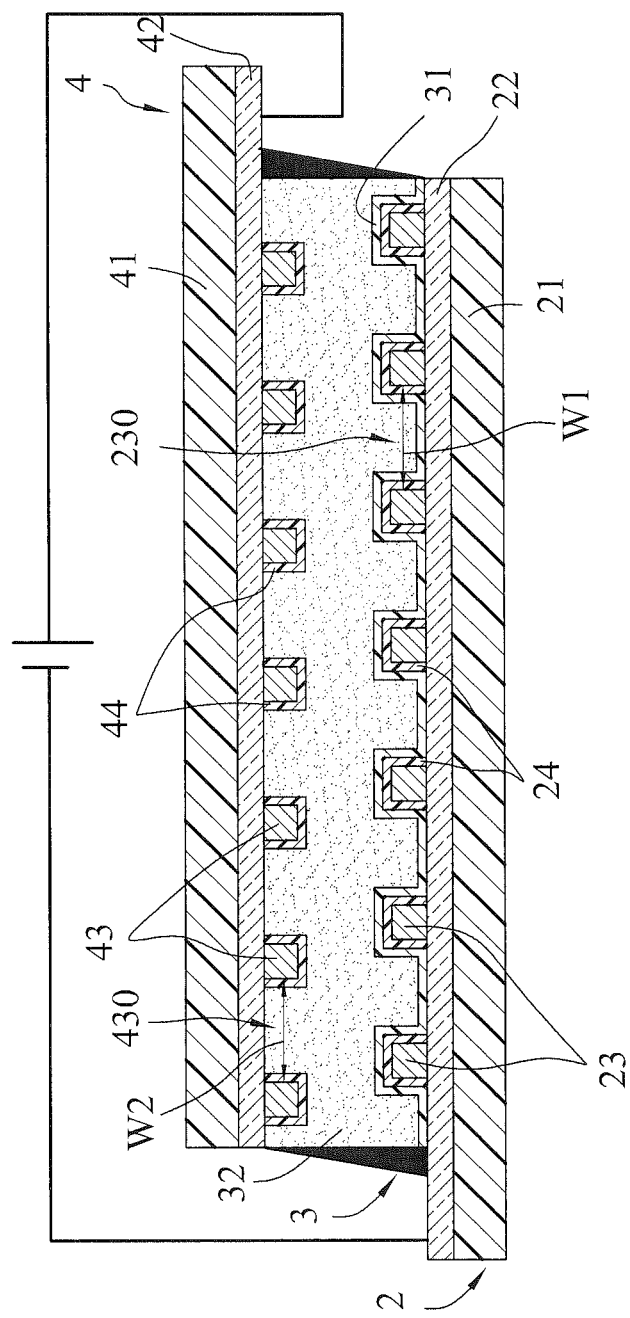
FIG. 5 is a sectional view of the third preferred embodiment of the electrochromic device according to the present invention.

FIG. 5 illustrates the third preferred embodiment of the electrochromic device according to the present invention. The third preferred embodiment differs from the first preferred embodiment in that the second electrode unit 4 further includes a plurality of second metal lines 43 and a plurality of second insulator strips 44. In this embodiment, the second metal lines 43 are formed on the second electrode layer 42. The second insulator strips 44 cover the second metal lines 43, respectively. The electrolyte layer 32 covers the second insulator strips 44. Every two adjacent ones of the second metal lines 43 are spaced apart from each other by a second gap 430 that has a width ($w_2$) ranging from 20 mm to 600 mm. Similar to the first metal lines 23, the second metal lines 43 can further enhance the spreading of the electric current to the electrochromic layer 31.

Figure 6:
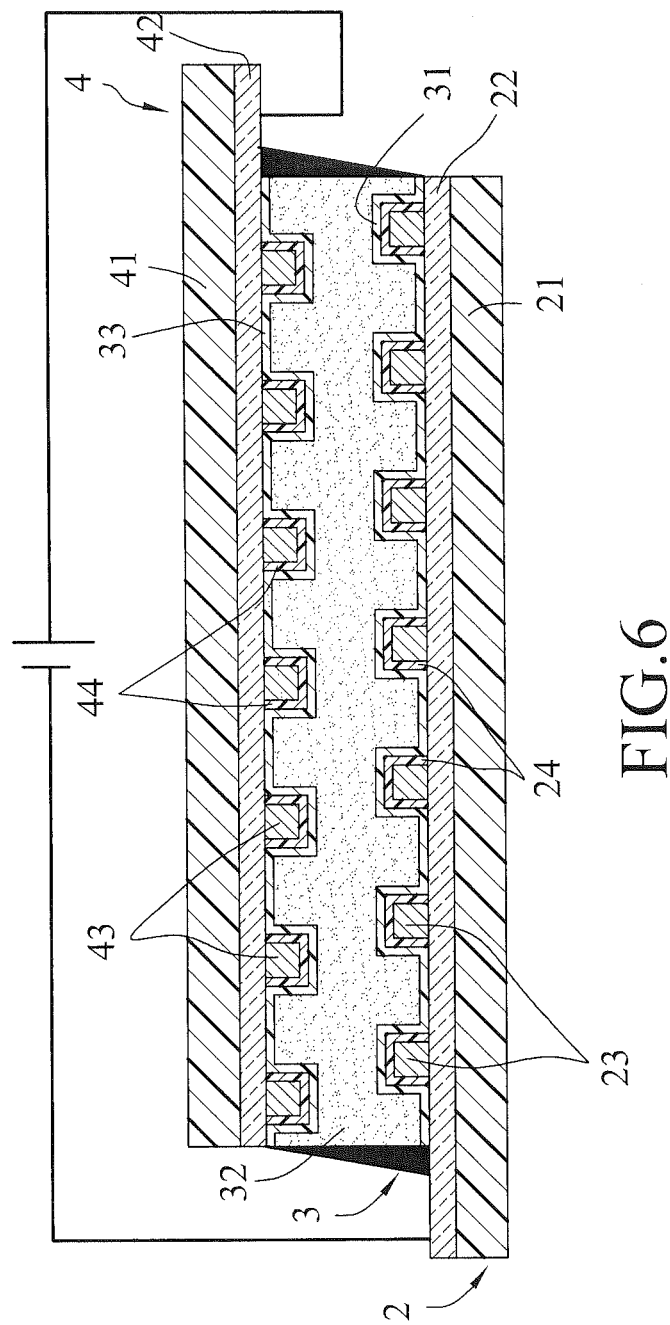
FIG. 6 is a sectional view of the fourth preferred embodiment of the electrochromic device according to the present invention.

FIG. 6 illustrates the fourth preferred embodiment of the electrochromic device according to the present invention. The fourth preferred embodiment differs from the first preferred embodiment in that the second electrode unit 4 further includes a plurality of second metal lines 43 and a plurality of second insulator strips 44 and that the electrochromic unit 3 further includes a second electrochromic layer 33 which is formed on the second electrode layer 42. In this embodiment, the second metal lines 43 are formed on the second electrode layer 42. The second insulator strips 44 cover the second metal lines 43, respectively. The second electrochromic layer 33 covers the second insulator strips 44. The electrolyte layer 32 is disposed between and is in contact with the first and second electrochromic layers 31, 33. The first and second metal lines 23, 43 extend in the same direction. The second metal lines 43 are made from the metallic material. The second insulator strips 44 are made from the electrical insulator material.

Figure 7:
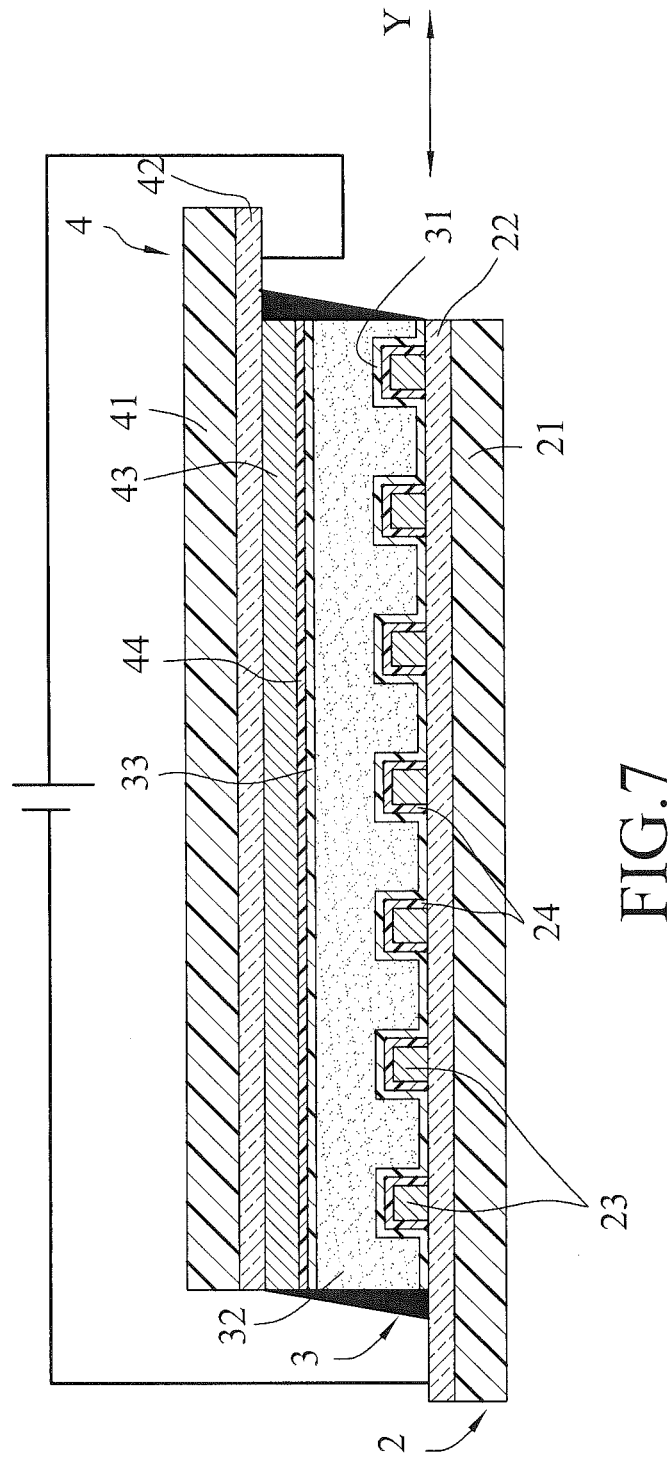
FIG. 7 is a sectional view of the fifth preferred embodiment of the electrochromic device according to the present invention.
Figure 8:
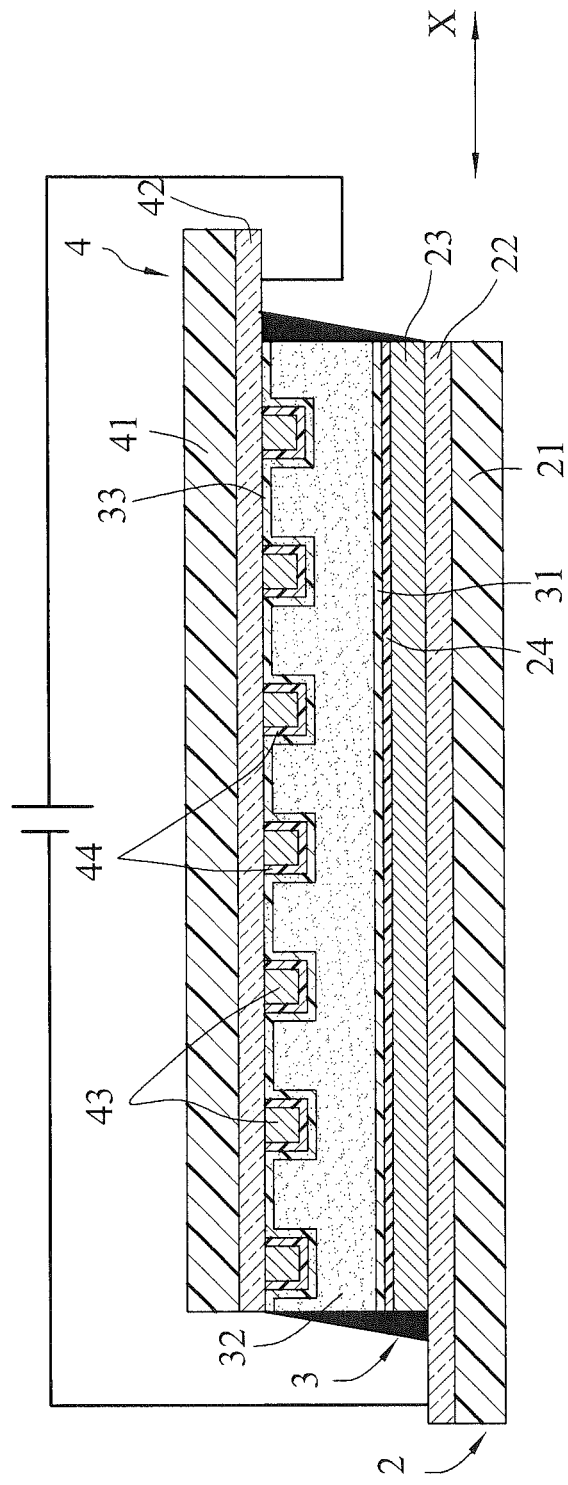
FIG. 8 is another sectional view of the fifth preferred embodiment.

FIGS. 7 and 8 illustrate the fifth preferred embodiment of the electrochromic device according to the present invention. The fifth preferred embodiment differs from the fourth preferred embodiment in that the second metal lines 43 extend in a second direction (Y) that is transverse to the first direction (X).

With the inclusion of the first metal lines 23 and/or the second metal lines 43 in the electrochromic device of the present invention, the aforesaid drawback associated with the prior art may be alleviated.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electrochromic device comprising:
   a first electrode unit including a first electrode layer, a plurality of spaced apart first metal lines that are formed on said first electrode layer, and a plurality of first insulator strips that at least partially cover said first metal lines, respectively;
   a second electrode unit spaced apart from said first electrode unit and including a second electrode layer; and
   an electrochromic unit sandwiched between said first and second electrode units and including a first electrochromic layer and an electrolyte layer, said first electrochromic layer being formed on said first electrode layer, said electrolyte layer being disposed between said first electrochromic layer and said second electrode layer.

2. The electrochromic device of claim 1, wherein said first electrochromic layer covers said first insulator strips, said electrolyte layer being in contact with said first electrochromic layer and said second electrode layer.

3. The electrochromic device of claim 1, wherein said second electrode unit further includes a plurality of second metal lines that are formed on said second electrode layer, and a plurality of second insulator strips that cover said second metal lines, respectively.

4. The electrochromic device of claim 3, wherein said electrochromic unit further includes a second electrochromic layer that is formed on said second electrode layer and that covers said second insulator strips, said electrolyte layer being disposed between and being in contact with said first and second electrochromic layers.

5. The electrochromic device of claim 3, wherein said first and second metal lines are made from a metallic material that is selected from the group consisting of Au, Ag, Cu, Al, and combinations thereof.

6. The electrochromic device of claim 3, wherein said first and second metal lines extend in the same direction, two adjacent ones of said first metal lines being spaced apart from each other by a first gap that has a width ranging from 20 mm to 600 mm, two adjacent ones of said second metal lines being spaced apart from each other by a second gap that has a width ranging from 20 mm to 600 mm.

7. The electrochromic device of claim 3, wherein said first metal lines extend in a first direction, said second metal lines extend in a second direction that is transverse to the first direction, two adjacent ones of said first metal lines being spaced apart from each other by a first gap that has a width ranging from 20 mm to 600 mm, two adjacent ones of said second metal lines being spaced apart from each other by a second gap that has a width ranging from 20 mm to 600 mm.

8. The electrochromic device of claim 3, wherein said first and second insulator strips are made from an electrical insulative material that is selected from the group consisting of photo curable resins, thermal curable resins, non-conductive curable resins, and epoxy resin.

9. The electrochromic device of claim 1, wherein said first electrode unit further includes a first substrate, said second electrode unit further including a second substrate, said first and second electrode layers being formed on said first and second substrates, respectively.

10. The electrochromic device of claim 9, wherein said first and second substrates are flexible.

11. The electrochromic device of claim 9, wherein said first and second substrates are rigid.

12. The electrochromic device of claim 1, wherein said first and second electrode layers are made from a transparent conductive material or a non-transparent conductive material.

* * * * *